(12) United States Patent
Kawakita et al.

(10) Patent No.: US 7,739,025 B2
(45) Date of Patent: Jun. 15, 2010

(54) ESTIMATION APPARATUS OF ALCOHOL COMPONENT AMOUNT IN FUEL

(75) Inventors: Koji Kawakita, Ohbu (JP); Katsunori Ueda, Okazaki (JP); Toshiyuki Miyata, Okazaki (JP); Hiroki Yamamoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/343,257

(22) Filed: Dec. 23, 2008

(65) Prior Publication Data

US 2009/0177370 A1 Jul. 9, 2009

(30) Foreign Application Priority Data

Dec. 25, 2007 (JP) ............................. 2007-332204

(51) Int. Cl.
*F02M 51/00* (2006.01)
*F02M 33/02* (2006.01)

(52) U.S. Cl. ......................... 701/106; 123/480; 123/520

(58) Field of Classification Search ................ 701/103, 701/106; 123/480, 520
See application file for complete search history.

(56) References Cited

U.S. PATENT DOCUMENTS 5,243,951 A * 9/1993 Nakaniwa .................... 123/674

| 6,666,198 | B2 * | 12/2003 | Mitsutani | 123/674 |
| 6,928,998 | B2 * | 8/2005 | Abe | 123/674 |
| 6,975,933 | B2 * | 12/2005 | Abe et al. | 701/109 |
| 7,209,826 | B2 * | 4/2007 | Abe et al. | 701/109 |
| 2009/0082947 | A1 * | 3/2009 | Tashima | 701/109 |

FOREIGN PATENT DOCUMENTS

| JP | 3903925 B2 | | 9/2004 |
| JP | 2009-144574 | * | 7/2009 |
| JP | 2009-156054 | * | 7/2009 |

* cited by examiner

*Primary Examiner*—Hai H Huynh
(74) *Attorney, Agent, or Firm*—Birch, Stewart, Kolasch & Birch LLP (57) ABSTRACT

An estimation apparatus includes: a learning prohibition unit, configured to prohibit a learning unit from executing a learning control and retain a learning value, which is set just before prohibiting, as a fixed learning value which is a fixed value, when the fuel component amount estimation condition is satisfied; an air-fuel ratio correction amount computation unit, configured to compute a correction amount of the air-fuel ratio based on the feedback correction value and the fixed learning value, when the fuel component amount estimation condition is satisfied; an injection correction value change rate computation unit, configured to compute a change rate of the correction amount; an alcohol component correction value computation unit, configured to compute an alcohol component correction value based on the change rate; and an alcohol component amount estimation unit, configured to estimate an alcohol component amount in fuel based on the alcohol component correction value.

7 Claims, 7 Drawing Sheets

ESTIMATION APPARATUS OF ALCOHOL COMPONENT AMOUNT IN FUEL

BACKGROUND OF THE INVENTION

This invention relates to an estimation apparatus of an alcohol component amount in fuel.

A vehicle installing an engine that can use composite fuel containing a gasoline component and an alcohol component has been developed. Such a vehicle is known as a name of FFV (Flexible Fuel Vehicle).

In fact, the ratio between the gasoline component and the alcohol component (fuel property) in the composite fuel supplied to such an FFV engine is not always constant.

For example, assume that composite fuel having an alcohol concentration of 80% is stored in a fuel tank. Then, fuel having an alcohol concentration of 0% (namely, fuel having a gasoline concentration of 100%) may be supplied to the fuel tank or fuel having an alcohol concentration of 100% (namely, fuel having a gasoline concentration of 0%) may be supplied to the fuel tank. The fuel supply amount varies from one time to another.

In the engine using such composite fuel, there is a demand for appropriately adjusting the fuel injection amount in response to the fuel property of the composite fuel.

In other words, in the FFV, it is necessary to directly detect or estimate the fuel property of the composite fuel. There is an example of an art of estimating the fuel property of the composite fuel (refer to Japanese Patent No. 3903925).

However, the estimation accuracy of the fuel property according to the art disclosed in Japanese Patent No. 3903925 may be insufficient.

For example, in the art disclosed in Japanese Patent No. 3903925, the alcohol concentration is estimated and updated based on the correlation between the air-fuel ratio sensitivity correction total amount, which is the product of the air-fuel ratio correction amount and the fuel property component correction amount, and the alcohol concentration. The air-fuel ratio correction amount is calculated from an air-fuel ratio feedback correction coefficient and an air-fuel ratio learning correction coefficient.

Thus, the air-fuel ratio learning correction coefficient for compensating for the effect of the engine's individual difference (variations in performance) and the effect of variation with time is reflected on the estimation of the alcohol concentration and the accuracy of the alcohol concentration estimation value is degraded.

On the other hand, Japanese Patent No. 3903925 also discloses an art of estimating the alcohol concentration from the product of the air-fuel ratio feedback correction coefficient and the fuel property component correction amount, without the air-fuel ratio learning correction coefficient.

However, also in this case, the accuracy of the alcohol concentration estimation value still worsens because the effect of the engine's individual difference, etc., on the fuel injection amount is not considered.

On the other hand, a technique of providing a sensor for directly detecting the fuel property in a fuel tank is also possible, but such a sensor is expensive and an increase in the cost is incurred.

SUMMARY

It is therefore an object of the invention to provide an estimation apparatus of an alcohol component amount in fuel that can estimate the component amount of alcohol contained in fuel with high accuracy while suppressing an increase in the cost.

In order to achieve the object, according to the invention, there is provided an estimation apparatus of an alcohol component amount in fuel, the estimation apparatus comprising:

an exhaust air-fuel ratio detection unit, configured to detect an air-fuel ratio of exhaust discharged from an engine;

a feedback correction value setting unit, configured to set a feedback correction value by feedback control based on the detected air-fuel ratio;

a learning unit, configured to execute learning control for setting a learning value of the air-fuel ratio based on the set feedback correction value;

an estimation condition satisfaction determination unit, configured to determine whether or not a fuel component amount estimation condition is satisfied;

a learning prohibition unit, configured to prohibit the learning unit from executing the learning control and retain the learning value, which is set just before prohibiting, as a fixed learning value which is a fixed value, when the estimation condition satisfaction determination unit determines that the fuel component amount estimation condition is satisfied;

an air-fuel ratio correction amount computation unit, configured to compute a correction amount of the air-fuel ratio based on the feedback correction value and the fixed learning value, when the estimation condition satisfaction determination unit determines that the fuel component amount estimation condition is satisfied;

an injection correction value change rate computation unit, configured to compute a change rate of the correction amount;

an alcohol component correction value computation unit, configured to compute an alcohol component correction value based on the change rate; and an alcohol component amount estimation unit, configured to estimate the alcohol component amount in the fuel based on the alcohol component correction value.

The injection correction value change rate computation unit may set an injection correction reference value in response to the fixed learning value, and compute the change rate based on the injection correction reference value.

The alcohol component amount estimation unit may execute first estimation of the alcohol component amount when absolute value of the change rate exceeds a first percentage, and execute second estimation of the alcohol component amount each time absolute value of the change rate exceeds a second percentage smaller than the first percentage, after executing the first estimation.

The estimation apparatus may further comprise: a fuel tank, adapted to store fuel to be supplied to the engine; and a fuel storage amount detection unit, configured to detect a fuel storage amount in the fuel tank. The fuel component amount estimation condition includes a condition on an increase in the fuel storage amount.

The estimation apparatus may further comprise: a canister, adapted to store fuel vaporized in the fuel tank; a canister purge execution unit, configured to execute canister purge of emitting the vaporized fuel in the canister into the engine; and a canister purge prohibition unit, configured to prohibit the canister purge execution unit from executing the canister purge. The fuel component amount estimation condition includes a condition that the canister purge prohibition unit prohibits the canister purge execution unit from executing the canister purge.

The estimation apparatus may further comprise: a canister, adapted to store fuel vaporized in the fuel tank; and a canister purge execution unit, configured to execute canister purge of emitting the vaporized fuel in the canister into the engine. When a time period during which the canister purge execution unit does not execute the canister purge is shorter than a threshold value, the feedback correction value setting unit sets the feedback correction value by using a special value different from an ordinary value as a gain of the feedback control.

The air-fuel ratio correction amount computation unit may set an estimation time injection correction value which is a correction value of a target injection amount of the fuel injected in the engine.

DETAILED DESCRIPTION OF PREFERRED EMBODIMENTS

An estimation apparatus of the alcohol component amount in fuel according to one embodiment of the invention will be discussed with reference to the accompanying drawings.

Figure 1:
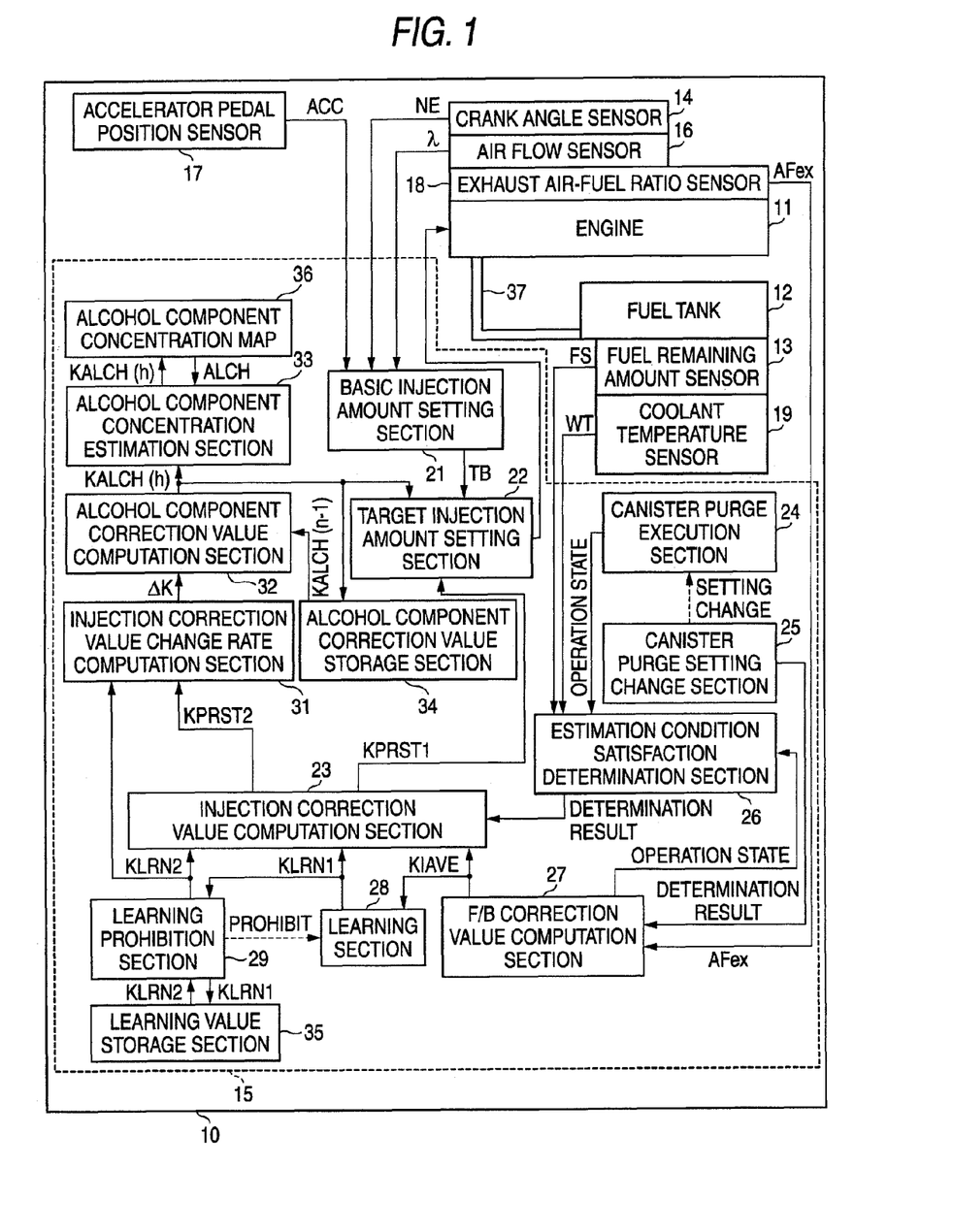
FIG. 1 is a schematic block diagram to show the configuration of an estimation apparatus of an alcohol component amount according to an embodiment of the invention.

As shown in FIG. 1, composite fuel containing an alcohol component and a gasoline component is supplied from a fuel tank 12 via a fuel pipe 37 to an engine 11 installed in a vehicle 10 which is an FFV. A storage amount FS of composite fuel in the fuel tank 12 is detected by a fuel remaining amount sensor 13.

The vehicle 10 is provided with a canister (not shown) for temporarily storing fuel vaporized in the Fuel tank 12 so as to be able to emit the vaporized fuel at an appropriate timing.

The engine 11 is provided with a crank angle sensor 14 for detecting engine speed NE. The detection result of the crank angle sensor 14 is read by an engine ECU (Electronic Control Unit) 15 described later.

An air flow sensor 16 is provided in an intake air passage (not shown) of the engine 11. The air flow sensor 16 detects intake air flow quantity λ and the detection result of the air flow sensor 16 is read by the engine ECU 15.

An accelerator pedal position sensor 17 for detecting accelerator pedal (not shown) depression amount ACC is provided in a cabin of the vehicle 10. The detection result of the accelerator position sensor 17 is also read by the engine ECU 15.

An exhaust air-fuel ratio sensor 18 is provided in an exhaust passage (not shown) of the engine 11. The exhaust air-fuel ratio sensor IS detects air-fuel ratio AFex of exhaust discharged from the engine 11. The detection result of the exhaust air-fuel ratio sensor 18 is also read by the engine ECU 15.

The vehicle 10 is provided with a coolant temperature sensor 19 for detecting temperature WT of a coolant of the engine 11. The detection result of the coolant temperature sensor 19 is also read by the engine ECU 15.

The vehicle 10 further includes the engine ECU 15 which is an electronic control unit having a CPU, memory, and an interface device (not shown).

The engine ECU 15 includes as software, a basic injection amount setting section 21, a target injection amount setting section 22, an injection correction value computation section 23, a canister purge execution section 24, a canister purge setting change section 25, an estimation condition satisfaction determination section 26, a feedback correction value computation section 27, a learning section 28, a learning prohibition section 29, an injection correction value change rate computation section 31, an alcohol component correction value computation section 32, and an alcohol concentration estimation section 33.

As storage areas, an alcohol component correction value storage section 34 and a learning value storage section 35 are set in memory (not shown) of the engine ECU 15.

Further, an alcohol concentration map 36 is stored in the memory.

The basic injection amount setting section 21 sets basic injection amount TB based on the accelerator pedal depression amount ACC detected by the accelerator position sensor 17, the engine speed NE detected by the crank angle sensor 14, and the intake air flow quantity λ of the engine 11 detected by the air flow sensor 16. The basic injection amount TB indicates the basic amount of the fuel injected by an injector (not shown) of the engine 11.

The target injection amount setting section 22 corrects the basic injection amount TB set by the basic injection amount setting section 21 according to an ordinary injection correction value KPRST1 and an alcohol component correction value KALCH, and sets a target injection amount TINJ. This target injection amount TINJ indicates the target amount of the fuel injected by the injector of the engine 11. The ordinary injection correction value KPRST1 is computed by the injection correction value computation section 23 described later and the alcohol component correction value KALCH is computed by the alcohol component correction value computation section 32 described later.

The injection correction value computation section 23 computes the injection correction value KPRST1 at the ordinary time based on an average value KIAVE of feedback correction value KI, and a learning value KLRN1. The feedback correction average value KIAVE is set by the feedback correction value computation section 27 described later and the learning value KLRN1 is set whenever necessary by the learning section 28 described later.

If the estimation condition satisfaction determination section 26 determines that an alcohol concentration estimation condition is satisfied, the injection correction value computation section 23 sets an injection correction value (estimation time injection correction value; exhaust air-fuel ratio correction amount) KPRST2 in estimating an alcohol concentration (alcohol component amount) ALCH of composite fuel stored in the fuel tank 12 by using the following expression (1):

$$KPRST2=\{KIAVE+(KLRN2-1)\} \times KALCH \quad (1)$$

where the feedback correction average value KIAVE is a value set by the feedback correction value computation section 27, the learning fixed value KLRN2 is a value retained as a fixed value in the learning value storage section 35 by the learning prohibition section, and KALCH is a value computed by the alcohol component correction value computation section 32 described later.

The feedback correction value computation section 27 computes the average value KIAVE of the feedback correction value KI based on the exhaust air-fuel ratio AFex detected by the exhaust air-fuel ratio sensor 18.

The feedback correction value computation section 27 sets a feedback gain to an ordinary value or a special value in exhaust air-fuel ratio feedback control based on the result of the purge cut time determination of the canister purge setting change section described later.

In the embodiment, the feedback gain as the ordinary value is 1 and the feedback gain as the special value is 1.5. There is a possibility that a change in the fuel property during the purge execution time period may appear as an exhaust air-fuel ratio error in a stroke just after canister purge of control of emitting the vaporized fuel stored in the canister into a surge tank (not shown) of the engine 11 is prohibited (namely, if purge cut time PCT is short). The ordinary value and the special value of the feedback gain are provided so as to be able to follow the change promptly.

The learning section 28 executes control (learning control) of setting the learning value KLRN1 whenever necessary based on the feedback correction average value KIAVE set by the feedback correction value computation section 27. The learning value KLRN1 is a correction value for compensating for the machine-like characteristic difference and change of the injector's individual difference of the engine 11 and aged deterioration.

If the estimation condition satisfaction determination section 26 determines that the alcohol concentration estimation condition is satisfied, the learning prohibition section 29 prohibits the learning section 28 from executing the learning control and also retains the learning value KLRN1 just before the learning section 28 is prohibited in the learning value storage section 35 as the fixed value KLRN2.

The canister purge execution section 24 executes canister purge of control of emitting the vaporized fuel stored in the canister into an intake air port of the engine 11. It also executes canister purge every predetermined purge cycle.

If the estimation condition satisfaction determination section 26 determines that a condition (B) is satisfied, the canister purge setting change section 25 changes the execution cycle of the canister purge (namely, the purge cycle) of the canister purge execution section 24 from an ordinary cycle to a special cycle.

The special cycle is set shorter than the ordinary cycle. Therefore, the purge cycle is set to the special cycle, whereby the canister purge execution frequency can be suppressed as compared with the case where the purge cycle is set to the ordinary cycle.

Further, the canister purge setting change section 25 computes the time period during which the canister purge execution section 24 does not execute the canister purge (namely, the purge cut time PCT) and also determines whether or not the purge cut time PCT is less than a threshold time PCTTH. This determination is called purge cut time determination and the determination result is read into the feedback correction value computation section 27.

The canister purge setting change section 25 makes a purge cut time determination considering there is a possibility that a change in the fuel property during the purge execution time period may appear as an exhaust air-fuel ratio error in a stroke as described above if the purge cut time PCT is less than the threshold time PCTTH (namely, just after the purge cut).

The estimation condition satisfaction determination section 26 determines whether or not the alcohol concentration estimation condition (fuel component amount estimation condition) is satisfied in response to the composite fuel storage amount FS in the fuel tank 12 detected by the fuel remaining amount sensor 13, the coolant temperature WT detected by the coolant temperature sensor 19, the operation state of the feedback correction value computation section 27, and the operation state of the canister purge execution section 24.

The alcohol concentration estimation condition specifically is set so as to contain the following conditions (A) to (E):

Condition (A): An increase in the composite fuel storage amount FS in the fuel tank 12 detected by the fuel remaining amount sensor 13.

Condition (B): Fuel consumption integrated quantity $\Sigma FL$ (k) after refueling completion is equal to or greater than a first threshold value FLTH1 and is equal to or less than a second threshold value FLTH2 [condition B1] or exceeds the second threshold value FLTH2 and a concentration estimation execution condition flag is set to OFF [condition B2].

Condition (C): The coolant temperature WT is equal to or greater than a threshold coolant temperature WTTH.

Condition (D): The feedback correction value computation section 27 executes exhaust air-fuel ratio feedback control.

Condition (E): The canister purge execution section 24 executes canister purge.

If all of these conditions (A) to (E) are satisfied, the estimation condition satisfaction determination section 26 determines that the alcohol concentration estimation condition is satisfied.

The condition (A) is a condition set considering the fact that it can be assumed that the fuel property of the composite fuel can change as the composite fuel storage amount FS in the fuel tank 12 increases.

In the condition (B), the fuel consumption integrated quantity $\Sigma FL$ (k) is provided by integrating the decrease amount of the composite fuel storage amount FS after completion of refueling the fuel tank 12 and is computed according to the following expression (2):

$$\Sigma FL(k)=\Sigma FL(k-1)+FL(k) \tag{2}$$

where FL (k) indicates the fuel consumption amount in a control routine at the kth time and $\Sigma FL$ (k−1) indicates the integrated value of the fuel consumption amount in the control routine repeated until the (k−1)st time.

The condition (B) is a condition set to avoid the effect of the fuel remaining in the fuel pipe 37 connecting the fuel tank 12 and the engine 11 (pipe remaining fuel), namely, the composite fuel before refueling on the alcohol concentration estimation of the composite fuel after refueling.

Therefore, in the condition (B1), whether or not a predetermined amount of composite fuel has been consumed after completion of refueling is determined and more specifically, a determination is made by determining whether or not the following expression (3) is satisfied:

$$FLTH1 \leq \Sigma FL(k) \leq FLTH2 \tag{3}$$

The first threshold value FLTH1 is set as a value smaller than the second threshold value FLTH2.

The condition (B2) is set assuming a situation in which concentration change cannot be estimated if the fuel property changes because the alcohol concentration estimation condition is not satisfied at all if the concentration estimation execution condition flag is OFF although a larger amount of fuel than the second threshold value FLTH2 is consumed after completion of refueling.

The condition (C) is a condition set considering the fact that if the engine 11 is running in a cooling mode, namely, if the coolant temperature WT is less than the threshold coolant temperature WTTH (for example, 20° C.), the fuel amount injected from the injector of the engine 11 is made larger than that at the ordinary time.

The condition (D) is a condition set considering that it is assumed that exhaust air-fuel ratio feedback control is executed in the estimation apparatus of the alcohol component amount according to the embodiment of the invention. As a specific example of prohibiting execution of the exhaust air-fuel ratio feedback control, the case where the engine 11 runs under a high load at high speed, the case where the engine 11 runs in a fuel cut mode, or the like can be named.

The condition (E) is a condition set considering the fact that if canister purge is executed, the vaporized fuel purged from the canister is supplied to the engine 11 in addition to the fuel injected from the injector.

That is, the condition is set considering the fact that if the canister purge is executed, the vaporized fuel emitted from the canister will affect the exhaust air-fuel ratio feedback control.

The injection correction value change rate computation section 31 sets an injection correction reference value KBASE by using the following expression (4) and also computes a change rate $\Delta K$ of the estimation time injection correction value KPRST2 by using the following expression (5):

$$KBASE = \{1+(KLRN2-1)\} \times KALCH \quad (4)$$

$$\Delta K = (KPRST2 - KBASE)/KSASE \quad (5)$$

The alcohol component correction value computation section 32 executes alcohol component correction value computation control of computing an update value KALCH (n) of the alcohol component correction value KALCH by using the following expression (6):

$$KALCH(n) = (1+\Delta K) \times KALCH(n-1) \quad (6)$$

where KALCH (n−1) is the preceding value of the alcohol component correction value KALCH and is retained in the alcohol component correction value storage section 34. If the preceding value KALCH (n−1) is not retained in the alcohol component correction value storage section 34, namely, if first update value KALCH (n) computation is performed, the alcohol component correction value computation section 32 assumes that the preceding value KALCH (n−1) is 1.

In fact, the alcohol component correction value computation section 32 does not always perform calculation using expression (6) and performs calculation using expression (6) only if the following condition (F) or (G) is satisfied:

Condition (F): Absolute value |$\Delta K$| of the change rate $\Delta K$ of the estimation time injection correction value KPRST2 exceeds a first percentage Condition (G): As the condition (F) is satisfied, alcohol component correction value computation control is started and then the absolute value |$\Delta K$| of the change rate $\Delta K$ of the estimation time injection correction value KPRST2 exceeds a second percentage The second percentage is set as a smaller value than the first percentage.

The alcohol concentration estimation section 33 applies the alcohol component correction value KALCH (n) calculated by the alcohol component correction value computation section 32 to the alcohol concentration map 36, thereby estimating the alcohol concentration ALCH in composite fuel.

Figure 2:
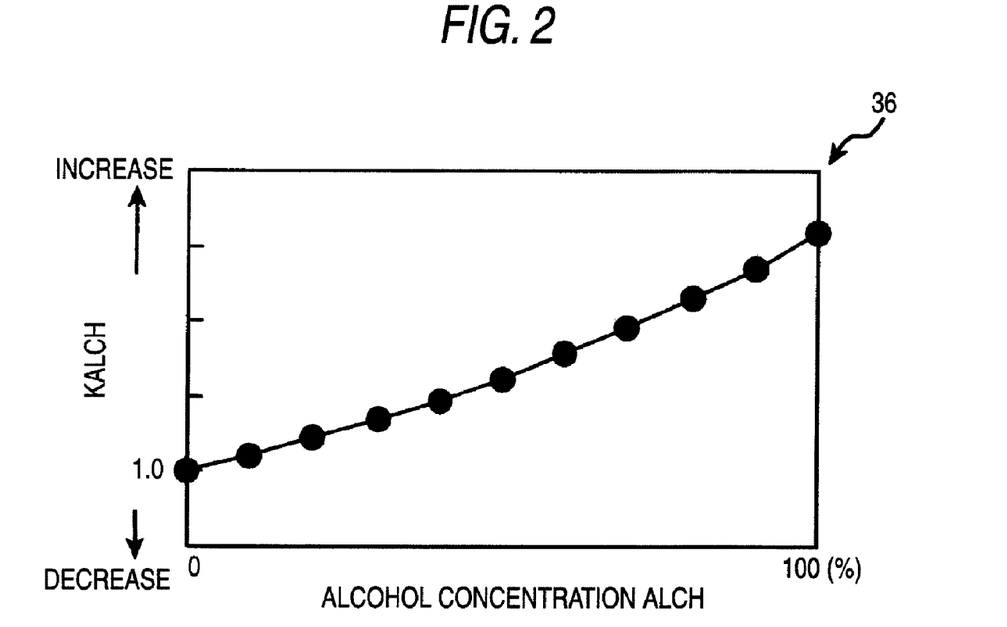
FIG. 2 is a schematic drawing to show an alcohol concentration map in the estimation apparatus of an alcohol component amount according to the embodiment of the invention.

As shown in FIG. 2, the alcohol concentration map 36 is a map defining the relationship that the alcohol concentration ALCH increases in response to an increase in the alcohol component correction value KALCH. The alcohol concentration map 36 is set based on the fact that the alcohol concentration ALCH in composite fuel and a theoretical air-fuel ratio have the relationship shown in FIG. 3.

Figure 3:
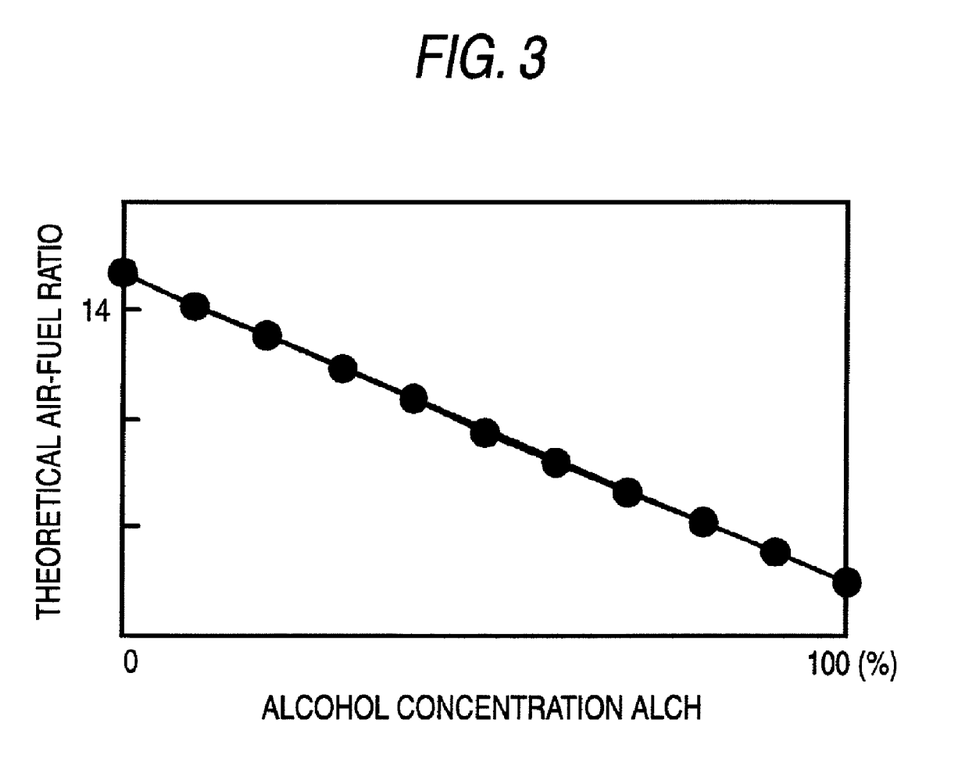
FIG. 3 is a schematic graph to show the relationship between theoretical air-fuel ratio and alcohol concentration on which the alcohol concentration map is based in the estimation apparatus of an alcohol component amount according to the embodiment of the invention.

This means that as the alcohol concentration ALCH becomes higher, the theoretical air-fuel ratio tends to become smaller. Thus, to run the engine 11 so as to keep the theoretical air-fuel ratio while using the composite fuel containing an alcohol component, it is necessary to increase the target injection amount TINJ with an increase in the alcohol concentration ALCH.

Thus, the alcohol component correction value KALCH essentially is used as a coefficient for correcting the target injection amount TINJ in response to a change in the alcohol concentration ALCH when the exhaust air-fuel ratio feedback control is performed; however, the alcohol component correction value KALCH can also be used as a value indicating the alcohol concentration ALCH in composite fuel, as shown in the alcohol concentration map 36.

Next, an estimation method of the alcohol component amount in fuel will be specifically discussed mainly with flowcharts of FIGS. 4 to 7.

Figure 4:
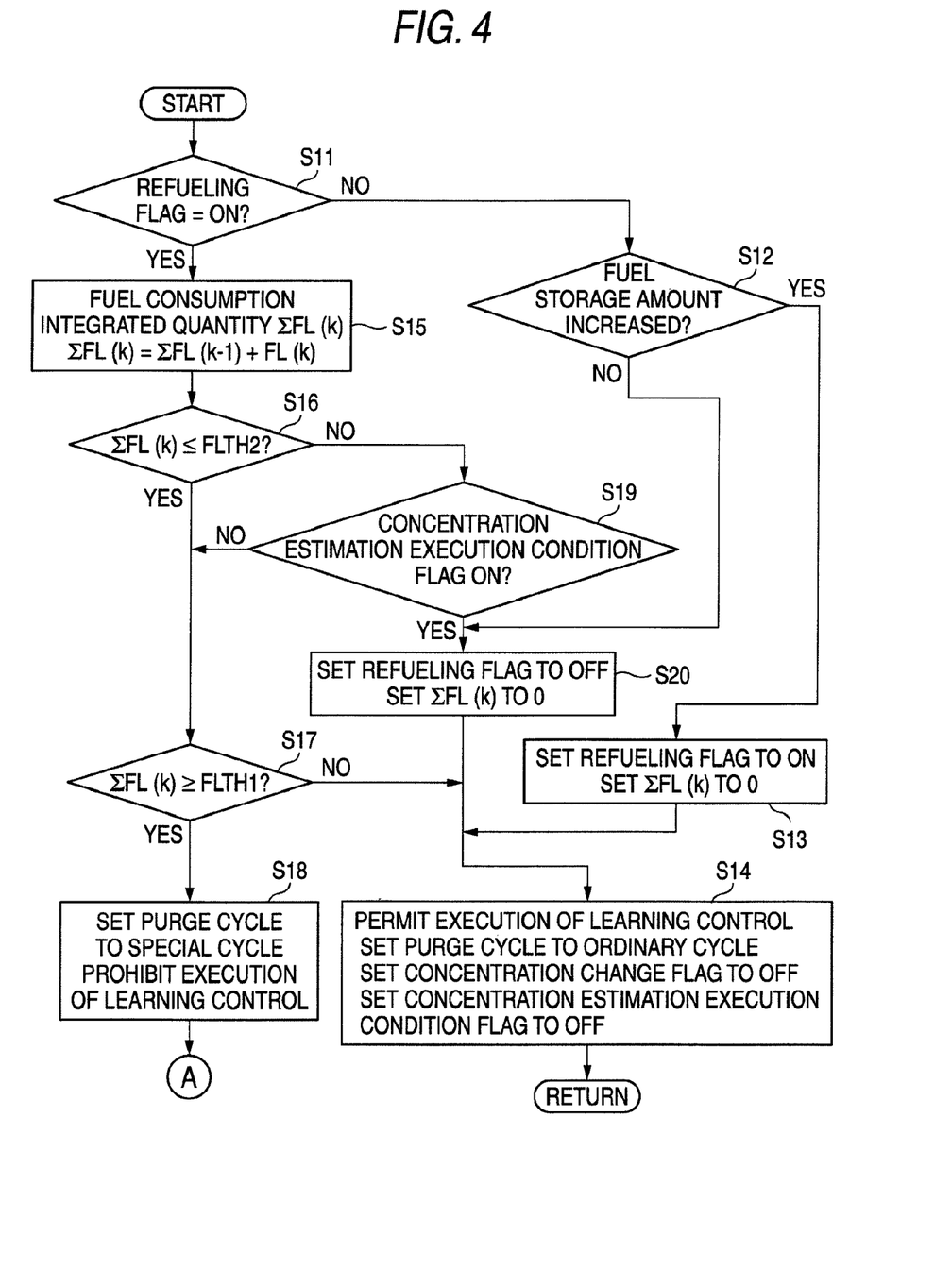
FIG. 4 is a flowchart to show control of a main routine of the estimation apparatus of an alcohol component amount according to the embodiment of the invention.

To begin with, at step S11 in FIG. 4, the estimation condition satisfaction determination section 26 determines whether or not a refueling flag is ON. This refueling flag is a flag set to ON when the fuel storage amount FS in the fuel tank 12 has increased, namely, if the fuel tank 12 has been refueled. The case where the refueling flag is set to ON and the case where the refueling flag is set to OFF are described later. The refueling flag is initialized to OFF.

If the refueling flag is OFF (NO at step S11), the estimation condition satisfaction determination section 26 determines whether or not the composite fuel storage amount FS detected by the fuel remaining amount sensor 13 increases (step S12).

If the fuel storage amount FS increases (YES at step S12), the estimation condition satisfaction determination section 26 sets the refueling flag to ON and also sets the fuel consumption amount $\Sigma FL$ (k) to zero (step S13) and then goes to step S14.

On the other hand, if the fuel storage amount FS does not change or decreases (NO at step S12), the estimation condition satisfaction determination section 26 sets the refueling flag to OFF and also sets the fuel consumption amount $\Sigma FL$ (k) to zero (step S20).

In this case, the learning prohibition section 29 does not prohibit the learning section 28 from executing the learning control and thus the learning section 28 sets the learning value KLRN1 whenever necessary (step S14; learning step). The canister purge execution section 24 sets the purge cycle to the ordinary cycle and executes canister purge every ordinary cycle (step S14).

The alcohol component correction value computation section 32 sets a concentration change flag to OFF and the estimation condition satisfaction determination section 26 sets the concentration estimation execution condition flag to OFF (step S14) and then the process returns.

On the other hand, if the estimation condition satisfaction determination section 26 determines that the refueling flag is ON (YES at step S11), it computes the fuel consumption integrated quantity $\Sigma FL$ (k) by using expression (2) described above (step S15).

The estimation condition satisfaction determination section 26 determines whether or not the fuel consumption integrated quantity ΣFL (k) calculated at step S15 is equal to or less than the second threshold value FLTH2 (step S16).

If the estimation condition satisfaction determination section 26 determines that the fuel consumption integrated quantity ΣFL (k) is equal to or less than the second threshold value FLTH2 (YES at step S16), further the estimation condition satisfaction determination section 26 determines whether or not the fuel consumption integrated quantity ΣFL (k) is equal to or greater than the first threshold value FLTH1 (step S17).

If the estimation condition satisfaction determination section 26 determines that the fuel consumption integrated quantity ΣFL (k) is equal to or greater than the first threshold value FLTH1 (YES at step S17), the canister purge setting change section 25 sets the purge cycle to the special cycle mode for suppressing the canister purge execution frequency of the canister purge execution section 24 (step S18). The learning prohibition section 29 prohibits the learning section 28 from executing the learning control (step S18; learning prohibiting step).

On the other hand, if the estimation condition satisfaction determination section 26 determines that the fuel consumption integrated quantity ΣFL (k) exceeds the second threshold value FLTH2 (NO at step S16), the estimation condition satisfaction determination section 26 determines whether or not the concentration estimation execution condition flag is ON (step S19).

If the concentration estimation execution condition flag is ON (YES at step S19), the estimation condition satisfaction determination section 26 sets the refueling flag to OFF and also sets the fuel consumption integrated quantity ΣFL (k) to zero (step S20) and goes to step S14.

On the other hand, if the concentration estimation execution condition flag is OFF (NO at step S19), the estimation condition satisfaction determination section 26 goes to step S17.

Figure 5:
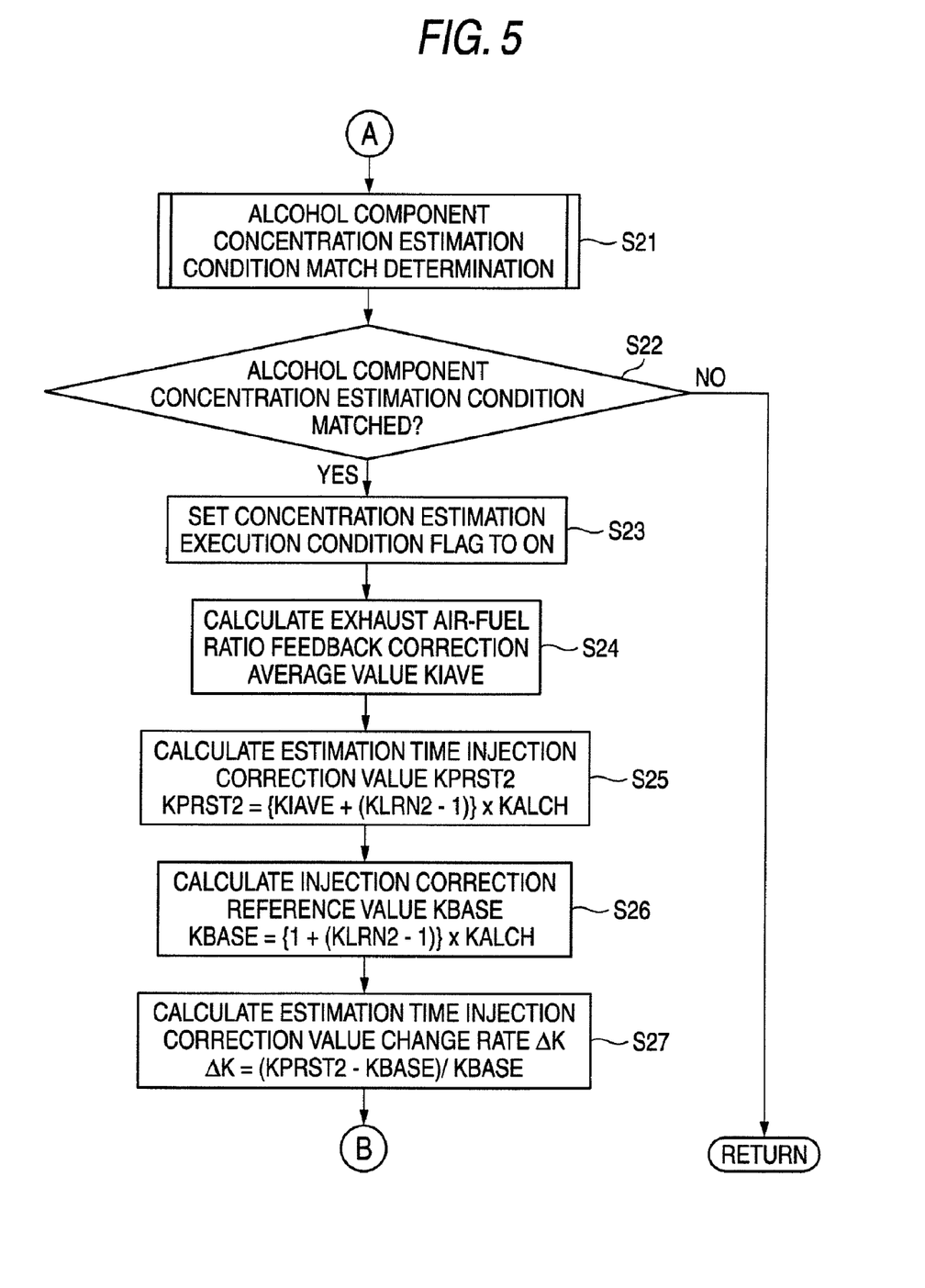
FIG. 5 is a flowchart to show control of the main routine of the estimation apparatus of an alcohol component amount according to the embodiment of the invention.

On the other hand, after the control at step S18 is executed, a subroutine for determining whether or not the alcohol component concentration estimation condition is satisfied is executed at step S21 (estimation condition satisfaction determination step) in FIG. 5.

Figure 7:
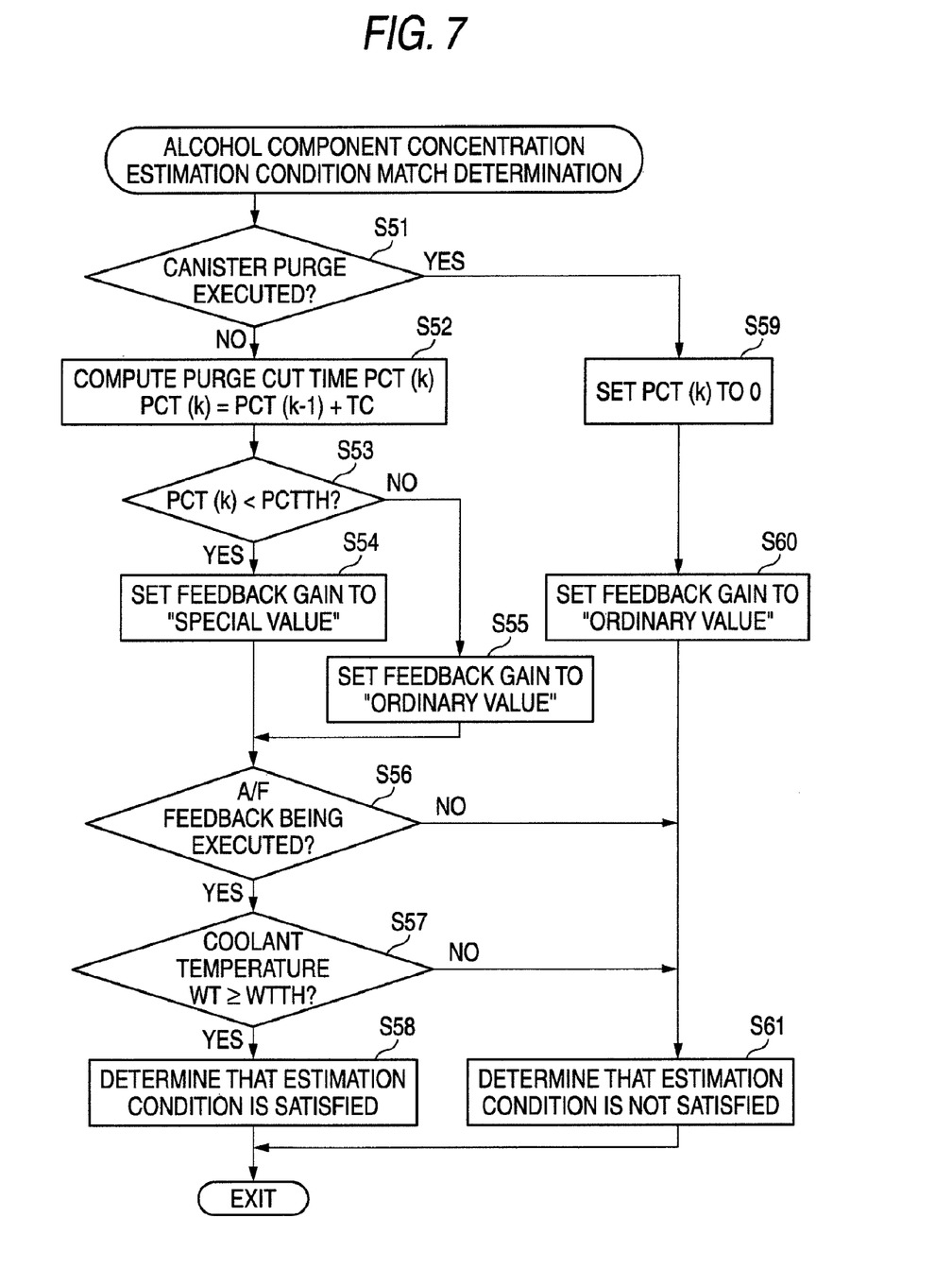
FIG. 7 is a flowchart to show control of a subroutine of the estimation apparatus of an alcohol component amount according to the embodiment of the invention.

In this subroutine, first, at step S51 in FIG. 7, the estimation condition satisfaction determination section 26 determines whether or not the canister purge execution section 24 executes canister purge.

If the estimation condition satisfaction determination section 26 determines that the canister purge execution section 24 does not execute canister purge (NO at step S51), the estimation condition satisfaction determination section 26 computes the purge cut time PCT (k) by using the following expression (7) (step S52):

$$PCT(k)=PCT(k-1)+TC \quad (7)$$

where PCT (k) indicates the purge cut time in the control routine at the kth time, PCT (k−1) indicates the purge cut time in the control routine at the (k−1)st time, and TC indicates the control cycle time.

Then, whether or not the purge cut time PCT (k) found at step S52 is less than the threshold time PCTTH is determined (step S53). The threshold time PCTTH is a threshold value set from the viewpoint of suppressing an exhaust air-fuel ratio error just after the purge cut, as described above.

If the purge cut time PCT (k) is less than the threshold time PCTTH (YES at step S53), the feedback correction value computation section 27 sets the feedback gain to a special value (step S54, feedback gain special value setting step) to promptly follow a change in the fuel property during purge execution time period.

On the other hand, if the purge cut time PCT (k) is equal to or greater than the threshold time PCTTH (NO at step S53), the feedback correction value computation section 27 sets the feedback gain to an ordinary value (step S55).

Further, the estimation condition satisfaction determination section 26 determines whether or not the feedback correction value computation section 27 performs exhaust air-fuel ratio feedback control (step S56) and also determines whether or not the coolant temperature WT is equal to or greater than the threshold coolant temperature WTTH (step S57).

If the exhaust air-fuel ratio feedback control is executed (YES at step S56) and the coolant temperature WT is equal to or greater than the threshold coolant temperature WTTH (YES at step S57), the estimation condition satisfaction determination section 26 determines that the alcohol component concentration estimation condition is satisfied (step S58).

On the other hand, if the exhaust air-fuel ratio feedback control is not executed (NO at step S56) or the coolant temperature WT is less than the threshold coolant temperature WTTH (NO at step S57), the estimation condition satisfaction determination section 26 determines that the alcohol component concentration estimation condition is not satisfied (step S61).

If the estimation condition satisfaction determination section 26 determines that the canister purge execution section 24 executes canister purge (YES at step S51), the estimation condition satisfaction determination section 26 sets the purge cut time PCT (k) to zero (step S59) and the feedback correction value computation section 27 sets the feedback gain to the ordinary value (step S60).

Then, the estimation condition satisfaction determination section 26 determines that the alcohol component concentration estimation condition is not satisfied (step S61).

At the termination of execution of the subroutine shown in FIG. 7, the subroutine returns to step S22 in FIG. 5 and whether or not the alcohol component concentration estimation condition is satisfied is determined (step S22).

That is, if it is determined at step S61 in FIG. 7 that the alcohol component concentration estimation condition is not satisfied (NO at step S22), the process returns. On the other hand, if it is determined at step S58 in FIG. 7 that the alcohol component concentration estimation condition is satisfied (YES at step S22), the estimation condition satisfaction determination section 26 sets the concentration estimation execution condition flag to ON (step S23).

Then, the feedback correction value computation section 27 calculates the exhaust air-fuel ratio feedback correction average value KIAVE (step S24).

The injection correction value computation section 23 calculates the estimation time injection correction value KPRST2 by using expression (1) described above (step S25).

Then, the injection correction value change rate computation section 31 sets the injection correction reference value KBASE by using expression (4) described above (step S26) and also computes the change rate ΔK of the estimation time injection correction value KPRST2 by using expression (5) described above (step S26 and step S27).

Figure 6:
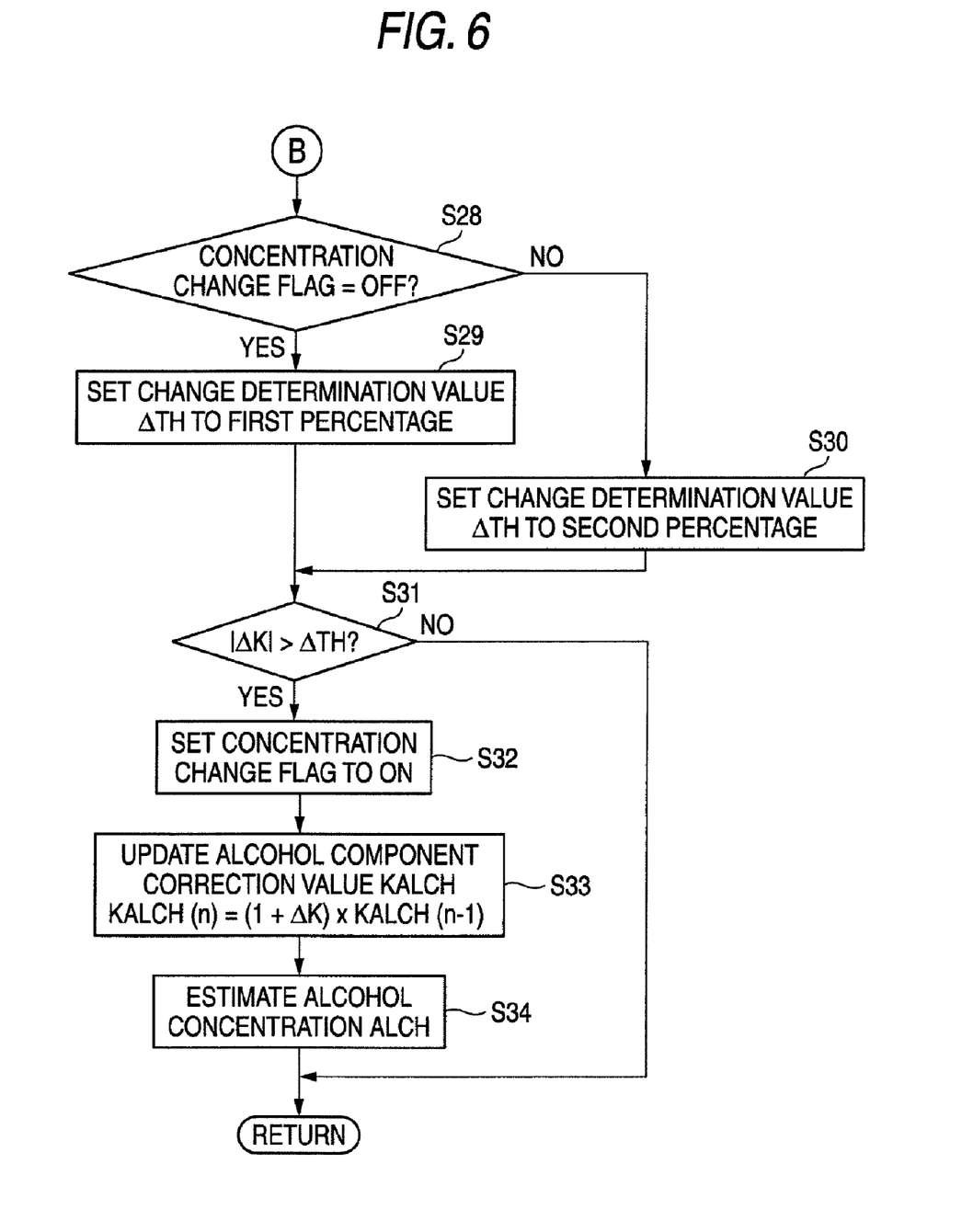
FIG. 6 is a flowchart to show control of the main routine of the estimation apparatus of an alcohol component amount according to the embodiment of the invention.

Then, the process goes to step S28 in FIG. 6 and the alcohol component correction value computation section 32 determines whether or not the concentration change flag is OFF, namely, whether or not the alcohol component correction value computation section 32 already starts alcohol component correction value computation control is determined.

If the concentration change flag is OFF (YES at step S28), namely, if the alcohol component correction value computation section 32 does not yet start alcohol component correction value computation control, the alcohol component correction value computation section 32 sets the change determination value ATH to the first percentage.

On the other hand, if the concentration change flag is not OFF (NO at step S28), namely, if the alcohol component correction value computation section 32 already starts alcohol component correction value computation control, the alcohol component correction value computation section 32 sets the change determination value ATH to the second percentage.

If the absolute value |ΔK| of the change rate ΔK of the estimation time injection correction value KPRST2 calculated at step S27 exceeds the change determination value ATH set at step S29 or S30 (YES at step S31), the alcohol component correction value computation section 32 sets the concentration change flag to ON (step S32) and computes the update value KALCH (n) of the alcohol component correction value KALCH by using expression (6) described above (step S33).

Steps S28 to S33 shown in FIG. 6 mean that the alcohol component correction value computation section 32 does not always perform the calculation using expression (6) described above and performs the calculation only if the above-mentioned condition (F) or (G) is satisfied.

Accordingly, while preventing alcohol concentration estimation from frequently being started although the alcohol concentration ALCH in composite fuel does not substantially change, it is made possible to execute alcohol concentration estimation without overlooking slight concentration change once after alcohol concentration estimation is started.

Then, the alcohol concentration estimation section 33 applies the alcohol component correction value KALCH (n) calculated at step S33 to the alcohol concentration map 36, thereby estimating the alcohol concentration ALCH in composite fuel with high accuracy (step S34).

Thus, the estimation apparatus of the alcohol component amount in fuel according to the embodiment of the invention can estimate the alcohol component amount contained in fuel with high accuracy at a low cost.

That is, at the ordinary time, the target injection amount TINJ of fuel injected in the engine 11 is set based on the ordinary injection correction value KPRST1 on which the learning value KLRN1 changed whenever necessary every control cycle is reflected; on the other hand, at the fuel component estimation time, the estimation time injection correction value KPRST2 on which the learning fixed value KLRN2 of the learning value retained just before the learning control is prohibited is reflected is computed.

Based on the change rate ΔK of the estimation time injection correction value KPRST2, the alcohol concentration ALCH component amount contained in fuel can be estimated with high accuracy at a low cost without providing any special sensor.

The absolute value |ΔK| of the injection correction value change rate ΔK exceeds the first percentage, the first estimation is executed and later, whenever the absolute value |ΔK| of the injection correction value change rate ΔK exceeds the second percentage, the second or later estimation is executed.

Therefore, while preventing a situation in which estimation of the alcohol concentration ALCH is frequently started although the alcohol concentration ALCH in fuel does not substantially change, it is made possible to finely estimate the alcohol concentration ALCH once after the alcohol concentration estimation is started.

An increase in the fuel storage amount FS in the fuel tank 12 is set as one of the fuel component estimation conditions, whereby the alcohol concentration ALCH in fuel can be estimated at an appropriate timing, because it can be estimated that the possibility that the fuel property in the fuel tank 12 may change is high when the fuel tank 12 is refueled.

A situation in which execution of canister purge has the effect on the feedback correction average value KIAVE is prevented, whereby the estimation accuracy of the alcohol concentration ALCH can be more enhanced.

A change in the fuel property during the purge execution time period can be promptly followed by setting the feedback gain to the special value just after purge cut (if the purge cut time PCT is less than the threshold time PCTTH).

While the embodiment of the invention has been described, it is to be understood that the invention is not limited to the specific embodiment and can be embodied in various modifications and changes without departing from the spirit and the scope of the invention.

In the embodiment described above, the canister purge setting change section 25 sets the purge cycle to the special cycle for suppressing the canister purge execution frequency of the canister purge execution section 24 by way of example, but the embodiment is not limited to the mode.

For example, a canister purge prohibition section for forcibly prohibiting the canister purge execution section 24 from executing canister purge may be provided in place of the canister purge setting change section 25.

In this case, if the estimation condition satisfaction determination section 26 determines that the alcohol concentration estimation condition is satisfied, the canister purge prohibition section may forcibly prohibit the canister purge execution section 24 from executing canister purge.

The estimation apparatus of an alcohol component amount in fuel of the invention can estimate the component amount of alcohol contained in fuel with high accuracy while suppressing an increase in the cost.

The estimation apparatus of the invention can compute the change rate of the exhaust air-fuel ratio correction amount appropriately based on the injection correction reference value set in response to the learning fixed value.

While preventing alcohol concentration estimation from frequently being executed in a situation in which it is not recognized that the alcohol component amount in fuel substantially changes, the estimation apparatus of the invention can finely execute alcohol concentration estimation once after starting alcohol concentration estimation.

If the possibility that the fuel property in the fuel tank may change when the fuel tank is refueled is high, the estimation apparatus of the invention can appropriately estimate the alcohol component amount in the fuel.

A situation in which execution of canister purge has the effect on the feedback correction average value is prevented, whereby the estimation accuracy of the alcohol component amount can be more enhanced.

If the time period during which the canister purge is not executed is short (just after purge cut), a change in the fuel property is correctly reflected on the feedback correction value, whereby the estimation accuracy of the alcohol component amount can be more enhanced.

The estimation time injection correction value of the correction value of the target injection amount of the fuel injected in the engine is set as the exhaust air-fuel ratio correction amount, whereby the fuel injection amount can be adjusted in the exhaust air-fuel ratio feedback control.

What is claimed is:

1. An estimation apparatus of an alcohol component amount in fuel, the estimation apparatus comprising:
    an exhaust air-fuel ratio detection unit, configured to detect an air-fuel ratio of exhaust discharged from an engine;
    a feedback correction value setting unit, configured to set a feedback correction value by feedback control based on the detected air-fuel ratio;
    a learning unit, configured to execute learning control for setting a learning value of the air-fuel ratio based on the set feedback correction value;
    an estimation condition satisfaction determination unit, configured to determine whether or not a fuel component amount estimation condition is satisfied;
    a learning prohibition unit, configured to prohibit the learning unit from executing the learning control and retain the learning value, which is set just before prohibiting, as a fixed learning value which is a fixed value, when the estimation condition satisfaction determination unit determines that the fuel component amount estimation condition is satisfied;
    an air-fuel ratio correction amount computation unit, configured to compute a correction amount of the air-fuel ratio based on the feedback correction value and the fixed learning value, when the estimation condition satisfaction determination unit determines that the fuel component amount estimation condition is satisfied;
    an injection correction value change rate computation unit, configured to compute a change rate of the correction amount;
    an alcohol component correction value computation unit, configured to compute an alcohol component correction value based on the change rate; and
    an alcohol component amount estimation unit, configured to estimate the alcohol component amount in the fuel based on the alcohol component correction value.

2. The estimation apparatus according to claim 1, wherein the injection correction value change rate computation unit
    sets an injection correction reference value in response to the fixed learning value, and
    computes the change rate based on the injection correction reference value.

3. The estimation apparatus according to claim 1, wherein the alcohol component amount estimation unit
    executes first estimation of the alcohol component amount when absolute value of the change rate exceeds a first percentage, and
    executes second estimation of the alcohol component amount each time absolute value of the change rate exceeds a second percentage smaller than the first percentage, after executing the first estimation.

4. The estimation apparatus according to claim 1, further comprising:
    a fuel tank, adapted to store fuel to be supplied to the engine; and
    a fuel storage amount detection unit, configured to detect a fuel storage amount in the fuel tank, wherein
    the fuel component amount estimation condition includes a condition of an increase in the fuel storage amount.

5. The estimation apparatus according to claim 4, further comprising:
    a canister, adapted to store fuel vaporized in the fuel tank;
    a canister purge execution unit, configured to execute canister purge of emitting the vaporized fuel in the canister into the engine; and
    a canister purge prohibition unit, configured to prohibit the canister purge execution unit from executing the canister purge, wherein
    the fuel component amount estimation condition includes a condition that the canister purge prohibition unit prohibits the canister purge execution unit from executing the canister purge.

6. The estimation apparatus according to claim 4, further comprising:
    a canister, adapted to store fuel vaporized in the fuel tank; and
    a canister purge execution unit, configured to execute canister purge of emitting the vaporized fuel in the canister into the engine, wherein
    when a time period during which the canister purge execution unit does not execute the canister purge is shorter than a threshold value, the feedback correction value setting unit sets the feedback correction value by using a special value different from an ordinary value as a gain of the feedback control.

7. The estimation apparatus according to claim 1, wherein the air-fuel ratio correction amount computation unit sets an estimation time injection correction value which is a correction value of a target injection amount of the fuel injected in the engine.

* * * * *